US012607838B2

(12) United States Patent
Nishimura et al.

(10) Patent No.: US 12,607,838 B2
(45) Date of Patent: Apr. 21, 2026

(54) CALCULATION METHOD, IMAGE-CAPTURING METHOD, AND IMAGE-CAPTURING APPARATUS

(71) Applicant: Lasertec Corporation, Yokohama (JP)

(72) Inventors: Yoshihiro Nishimura, Yokohama (JP); Shota Fujiki, Yokohama (JP); Yoshihiro Aoki, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 97 days.

(21) Appl. No.: 18/319,266

(22) Filed: May 17, 2023

(65) Prior Publication Data

US 2023/0375816 A1 Nov. 23, 2023

(30) Foreign Application Priority Data

May 20, 2022 (JP) ................................. 2022-083179

(51) Int. Cl.
*G02B 21/00* (2006.01)
*G01N 21/88* (2006.01)
*G01N 21/95* (2006.01)

(52) U.S. Cl.
CPC ..... *G02B 21/0056* (2013.01); *G01N 21/8851* (2013.01); *G01N 21/9501* (2013.01); *G02B 21/0072* (2013.01)

(58) Field of Classification Search
CPC ........... G01N 21/8851; G01N 21/9501; G01N 21/45; G01N 21/8806; G01N 21/93; G01N 21/958; G02B 21/0056; G02B 21/0072
See application file for complete search history.

(56) References Cited

U.S. PATENT DOCUMENTS 4,743,117 A 5/1988 Kitabayashi et al.
2019/0234729 A1* 8/2019 Goodwin ........... G01B 11/2441

FOREIGN PATENT DOCUMENTS

JP S61230003 A 10/1986
JP S62168008 A 7/1987
JP S6469933 A 3/1989
JP H01219605 A 9/1989
(Continued)

OTHER PUBLICATIONS

Japan Patent Office, Office Action Issued in Application No. 2022-083179, Feb. 10, 2026, 11 pages. (Submitted with Machine Translation).

*Primary Examiner* — Tri T Ton
(74) *Attorney, Agent, or Firm* — McCoy Russell LLP

(57) ABSTRACT

A calculation method, an image-capturing method, and an image-capturing apparatus are provided which can easily calculate a shear amount produced by an optical element arranged on an optical path of an interference optical system. A calculation method according to the present disclosure is a calculation method of calculating a shear amount produced by a predetermined optical element which is arranged on an optical path of an image-capturing optical system. The calculation method includes a step of capturing an interference contrast image of a quadric surface included in an object surface by the image-capturing optical system, a step of measuring a fringe interval of interference fringes included in the interference contrast image, and a step of calculating the shear amount based on a constant in a formula expressing the quadric surface and the fringe interval.

7 Claims, 8 Drawing Sheets

(56)     References Cited

FOREIGN PATENT DOCUMENTS

| | | | | |
|---|---|---|---|---|
| JP | H05312549 | A | * 11/1993 | ....... G01N 21/95607 |
| JP | 2527176 | A | 8/1996 | |
| JP | H0961370 | A | 3/1997 | |
| JP | 2004037429 | A | * 2/2004 | ......... G01B 9/02072 |

* cited by examiner

CALCULATION METHOD, IMAGE-CAPTURING METHOD, AND IMAGE-CAPTURING APPARATUS

CROSS REFERENCE TO RELATED APPLICATION

This application is based upon and claims the benefit of priority from Japanese patent application No. 2022-083179, filed on May 20, 2022, the disclosure of which is incorporated herein in its entirety by reference.

BACKGROUND

The present disclosure relates to a calculation method, an image-capturing method, and an image-capturing apparatus and particularly to a technique for calculating a shear amount.

A technique for quickly performing defect inspection and categorization of a compound semiconductor wafer, a glass substrate, and so forth is very necessary for quality control or improvement in a device or a product. Patent Literature 1 discloses a defect inspection apparatus using a differential interference contrast microscope. A differential interference contrast microscope separates illumination light into ordinary light and extraordinary light by a differential interference contrast prism such as a Nomarski prism. A shift amount between positions of the ordinary light and the extraordinary light is referred to as shear amount.

A path difference between the ordinary light and the extraordinary light will be described with reference to FIG. 1. The vertical direction (Z direction) in FIG. 1 represents a height direction. The lateral direction (S direction) in FIG. 1 represents a direction in which the illumination light is separated into the ordinary light and the extraordinary light, in other words, a shear direction. The ordinary light and the extraordinary light are linearly polarized light which vibrates in the S direction and linearly polarized light which vibrates in a direction perpendicular to the S direction.

FIG. 1 includes the ordinary light and the extraordinary light in a case where the shear amount is $\Delta S_1$ and the ordinary light and the extraordinary light in a case where the shear amount is $\Delta S_2$. A shear amount of $\Delta S_2$ is larger than $\Delta S_1$. An upper surface of a sample 50 is inclined at an angle of $\Phi$ with respect to the horizontal direction. A term $d_1$ denotes a difference in height in a case where the ordinary light and the extraordinary light are reflected by the sample 50 when the shear amount is $\Delta S_1$. A term $d_2$ denotes a difference in height in a case where the ordinary light and the extraordinary light are reflected by the sample 50 when the shear amount is $\Delta S_2$. The term $d_2$ is larger than $d_1$.

Patent Literature 1: Japanese Unexamined Patent Application Publication No. 1997-061370

Patent Literature 2: Japanese Unexamined Patent Application Publication No. 2004-037429

Patent Literature 3: Japanese Unexamined Patent Application Publication No. 1989-219605

Patent Literature 4: Japanese Unexamined Patent Application Publication No. 1989-069933

Patent Literature 5: Japanese Patent No. 2527176

SUMMARY

When inspection or categorization is performed by using a differential interference contrast image, in order to maintain precision, it is preferable that an intensity of a received light signal of a flat surface portion having no defect be made constant. Accordingly, inspections can be performed by using the same threshold value. In order to make constant the intensity of the received light signal, a path difference between ordinary light and extraordinary light has to be made constant, the path difference being produced by a Nomarski prism.

The path difference between the ordinary light and the extraordinary light is defined by a shear amount of a differential interference contrast prism and position adjustment of the differential interference contrast prism. Consequently, in a case where the shear amount of the differential interference contrast prism can be calculated, the position adjustment of the differential interference contrast prism is performed in accordance with a calculation result, and the intensity of the received light signal can thereby be maintained constant. In a case where the shear amount of the differential interference contrast prism can be calculated, by using the differential interference contrast prism having an appropriate shear amount, the intensity of the received light signal can be maintained constant. The intensity of the received light signal is made constant, and inspection conditions in cases where various samples are inspected by using the same apparatus can be made constant. Machine differences among different apparatuses with the same design can be reduced.

A description will be made about problems in a case where various samples are inspected by using the same apparatus. The path difference itself of the differential interference contrast prism (for example, the Nomarski prism) can be adjusted by using a level difference which is horizontally situated. Note that the path difference of the differential interference contrast prism denotes a path difference between the ordinary light and the extraordinary light, which occurs regardless of the samples. However, an actual sample (for example, a wafer) includes an inclination. In particular, a defect portion of the sample includes an inclination even when the sample itself is horizontal. Consequently, even in a case where the path difference of the differential interference contrast prism is the same and the same defect portion is observed, when the shear amount $\Delta S$ is different, the path difference between the ordinary light and the extraordinary light does not become the same, and the same brightness is not obtained. Because a portion having no defect includes an inclination, even when adjustment is performed such that the path difference of the differential interference contrast prism becomes the same, the same brightness is not obtained when the shear amount $\Delta S$ is different. In this case, it is difficult to conduct a defect inspection with a predetermined threshold value of brightness.

A description will be made about an example of a method for reducing the machine differences between different apparatuses with the same design. It is assumed that adjustment of the differential interference contrast prism is performed, in other words, the path difference of the differential interference contrast prism is defined in an apparatus A and an inspection is performed in an apparatus B under the same condition. In a case where the shear amount of the differential interference contrast prism can be measured, it can be determined that the shear amount of the differential interference contrast prism included in the apparatus A and the shear amount of the differential interference contrast prism included in the apparatus B are different from each other. In a case where the shear amounts are different, the differential interference contrast prism included in the apparatus B can be replaced by a differential interference contrast prism whose shear amount is included in a permissible range, or fine adjustment can be performed for the position of the differential interference contrast prism such that a change in brightness of a defect portion or the like is compensated, the change occurring due to a difference in the shear amount.

Accordingly, it is desired that a shear amount of a differential interference contrast prism be calculated. However, it is difficult to calculate the shear amount of the differential interference contrast prism based on a sample having a level difference or an inclination angle on a flat surface. There may be cases where even when images of a sample with a level difference are captured by using differential interference contrast prisms having different shear amounts, a sufficient difference cannot be observed between differential interference contrast images. In general, because the shear amount of the Nomarski prism is approximately one or two pixels of a microscopic observation image, it is difficult to perform measurement based on a width measurement or the like of an interference intensity profile. There is also a problem that it is troublesome to change an inclination angle of an object surface and a change in a reflected light intensity due to the inclination angle has to be taken into consideration.

The present disclosure has been made to solve such problems and provides a calculation method, an image-capturing method, and an image-capturing apparatus that can easily calculate a shear amount produced by a predetermined optical element which is arranged on an optical path of an interference optical system.

A calculation method according to the present disclosure is a calculation method of calculating a shear amount produced by a predetermined optical element which is arranged on an optical path of an interference optical system, the calculation method including:

a step of capturing an interference contrast image of a quadric surface included in an object surface by the interference optical system;

a step of measuring a fringe interval of interference fringes included in the interference contrast image; and a step of calculating the shear amount based on a constant in a formula expressing the quadric surface and the fringe interval.

An image-capturing method according to the present disclosure includes:

the calculation method;

a step of adjusting a position of the predetermined optical element based on the shear amount such that a path difference between two rays of light divided by the interference optical system becomes a predetermined value; and a step of capturing an interference contrast image of a sample by the interference optical system after the step of adjusting.

An image-capturing apparatus according to the present disclosure includes:

an interference optical system;

a predetermined optical element being arranged on an optical path of the interference optical system; and a processing unit configured to capture an interference contrast image of a quadric surface included in an object surface by the interference optical system and to subsequently execute a process of calculating a shear amount of the predetermined optical element based on a fringe interval of interference fringes included in the interference contrast image and a constant in a formula expressing the quadric surface.

The present disclosure can provide a calculation method, an image-capturing method, and an image-capturing apparatus that can easily calculate a shear amount produced by a predetermined optical element which is arranged on an optical path of an interference optical system.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
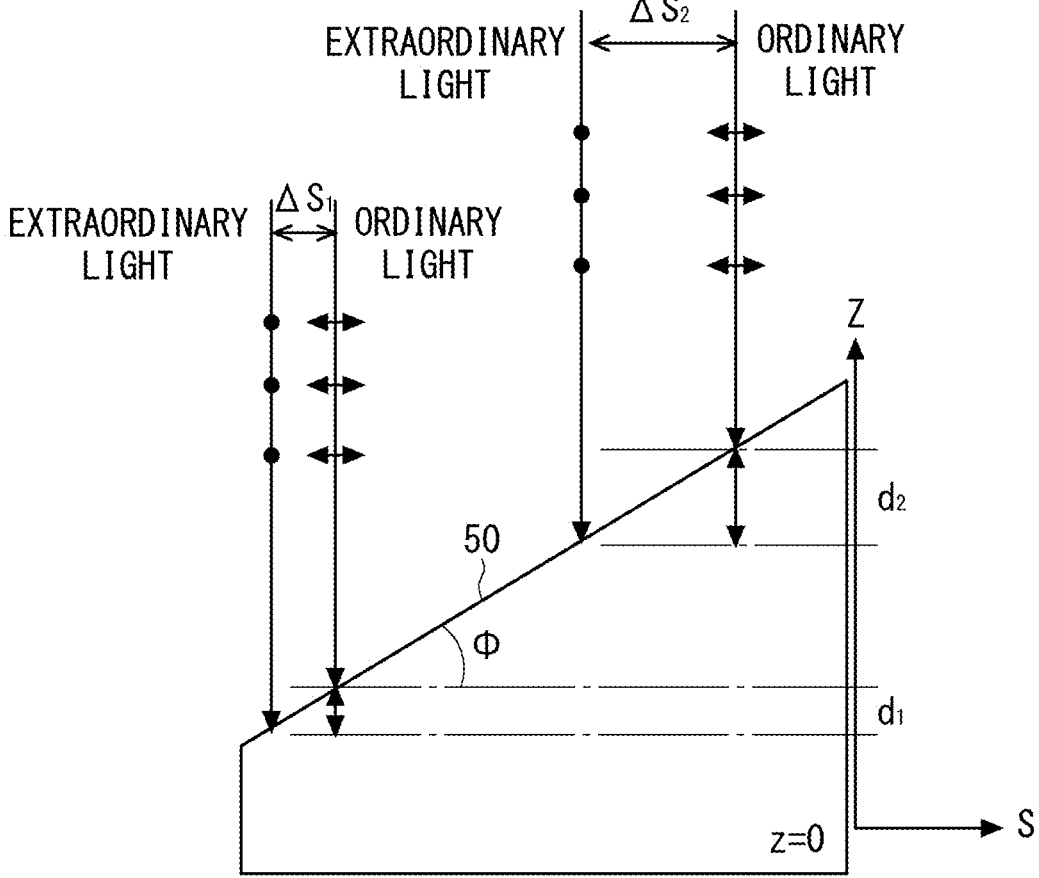
FIG. 1 is a diagram for explaining a relationship between a shear amount and a path difference.

A specific configuration of the present embodiment will hereinafter be described with reference to drawings. The following descriptions describe a preferable embodiment of the present disclosure, but the scope of the present disclosure is not limited to the following embodiment. In the following descriptions, elements provided with the same reference characters represent substantially the same contents.

First Embodiment

In the following, a calculation method, an image-capturing method, and an image-capturing apparatus according to a first embodiment will be described with reference to the drawings. The calculation method according to the first embodiment (hereinafter, referred to as present calculation method) is a method for evaluating a predetermined optical element (for example, a differential interference contrast prism) which is arranged on an optical path of an image-capturing optical system (for example, a confocal optical system). The image-capturing optical system is an interference optical system. In the following, a description will mainly be made about a case where the image-capturing optical system is a confocal optical system. Further, in the following, a description will mainly be made about a case where the image-capturing optical system is a differential interference contrast optical system, but the image-capturing optical system may be another interference optical system (for example, a shearing interference optical system).

First, an image-capturing apparatus 100 used in the present calculation method will be described with reference to FIG. 2. The image-capturing apparatus 100 detects reflected light, which is reflected by a sample (not illustrated), via the confocal optical system. The image-capturing apparatus 100 captures an image of a sample surface based on a detection result of the reflected light. The sample may be a wafer or the like of a compound semiconductor such as SiC or GaN or of a piezoelectric crystal. The sample may be a transparent wafer or a transparent substrate.

On the optical path of the confocal optical system, a predetermined optical element such as a differential interference contrast prism (for example, a Nomarski prism) is arranged. The predetermined optical element provides a relative lateral shift displacement to two rays of light divided by the interference optical system. In the following, a description will mainly be made about a case where the predetermined optical element is the differential interference contrast prism, but the predetermined optical element is not limited to a prism but may be a lens or a diffraction grating. In order to evaluate the differential interference contrast prism, the image-capturing apparatus 100 captures a differential interference contrast image of a quadric surface (for example, a sphere surface) included in an object surface. In a case where the quadric surface is a sphere surface, the sphere surface may be a surface of a steel ball for ball bearing or may be a surface of a glass bead. In the following, a description will mainly be made about a case where the quadric surface is a sphere surface, but the quadric surface may be a paraboloid or a circular column.

The image-capturing apparatus 100 includes a light source 11, an image-capturing optical system 110, a stage 31, a photodetector 43, and a processing unit 60. The image-capturing apparatus 100 is a confocal microscope which has the image-capturing optical system 110 as the confocal optical system. The image-capturing optical system 110 will also be referred to as interference optical system.

The light source 11 produces illumination light L1 for illuminating a spherical body 30 or the sample. The light source 11 is a laser light source, a lamp light source, or the like, for example. The image-capturing optical system 110 guides the illumination light L1 to a surface of the spherical body 30. The image-capturing optical system 110 is a line confocal optical system, for example, and forms a linear illumination region on the spherical body 30.

The image-capturing optical system 110 includes a filter 12, a polarizer 13, a lens 15, a slit 16, a half mirror 21, a scanner 22, a lens 23, a Nomarski prism 24, an objective lens 25, a lens 41, and an analyzer 42.

The illumination light L1 from the light source 11 is incident on the filter 12. The filter 12 is a bandpass filter, for example, and transmits light only at a predetermined wavelength. The illumination light L1 from the filter 12 is made linearly polarized light by the polarizer 13. The illumination light L1 is collected by the lens 15 and is incident on the slit 16. The slit 16 is arranged in a position conjugate with a focal plane of the objective lens 25. The slit 16 forms the illumination light into a linear shape.

The illumination light L1 as the linearly polarized light is incident on the scanner 22 via the half mirror 21. The half mirror 21 is a beam splitter which branches optical paths of the illumination light L1 and a reflected light L2 from the spherical body 30. The half mirror 21 transmits half incident light and reflects the remaining half.

The scanner 22 is provided as a vibrating mirror, a galvanometer mirror, a rotation mirror, or the like and deflects the illumination light L1. For example, on the spherical body 30, scanning with the illumination light L1 is performed in a direction orthogonal to the longitudinal direction of the linear illumination region.

The illumination light L1 reflected by the scanner 22 is incident on the Nomarski prism 24 via the lens 23. The Nomarski prism 24 is a differential interference contrast prism and branches the illumination light L1 as the linearly polarized light into two light beams. In other words, the illumination light L1 is transmitted through the Nomarski prism 24, is further transmitted through the objective lens 25, and thereby becomes two parallel light beams which are shifted in a lateral direction by a predetermined shear amount. Note that the differential interference contrast prism is not limited to the Nomarski prism 24 but may be a Wollaston prism.

The two light beams branched by the Nomarski prism 24 are orthogonal beams of linearly polarized light. In other words, one of the two light beams becomes ordinary light, and the other becomes extraordinary light. The two light beams branched by the Nomarski prism 24 are collected by the objective lens 25 and illuminate the surface of the spherical body 30. The two light beams illuminate different points on the spherical body 30. The ordinary light and the extraordinary light become beams of parallel light which are laterally shifted from each other when those pass through the objective lens 25. A lateral shift amount will be referred to as shear amount.

A focusing position by the objective lens 25 is on the surface of the spherical body 30. Because the slit 16 and a focal point of the objective lens 25 are in a conjugate image-forming relationship, on the spherical body 30, the linear illumination region corresponding to a slit direction is formed. For example, on the spherical body 30, the longitudinal direction of the linear illumination region is an X direction, and a scanning direction of the scanner 22 is a Y direction.

The spherical body 30 and the sample are placed on the stage 31. The stage 31 is a driven stage and moves the spherical body 30 or the sample in XYZ directions. A Z-scan is performed by the stage 31. The stage 31 moves in the Z direction, and a light collecting position of the illumination light L1 can thereby be set to the surface of the spherical body 30. It goes without saying that the objective lens 25 may be moved along an optical axis instead of the stage 31 to thereby align the light collecting position with the surface of the spherical body 30. By performing the Z-scan, a focused image and a height image of the spherical body 30 can be obtained. In a case where surface unevenness is small, an image of the spherical body 30 may be captured in a state where the surface is focused without performing the Z-scan.

The reflected light L2 reflected by the spherical body 30 includes two light beams. The reflected light L2 reflected by the spherical body 30 is incident on the Nomarski prism 24 via the objective lens 25. The Nomarski prism 24 combines the two light beams. The reflected light L2 is refracted by the lens 23 and is incident on the scanner 22. The reflected light L2 is descanned by the scanner 22 and is incident on the half mirror 21. The half mirror 21 reflects half the reflected light L2 in a direction of the lens 41.

The lens 41 collects the reflected light L2 from the half mirror 21 to a light receiving surface of the photodetector 43. The photodetector 43 is a line sensor in which plural pixels are arrayed in one line, for example. The pixels of the photodetector 43 are arrayed along a direction corresponding to the linear illumination region. The light receiving surface of the photodetector 43 and the focal plane of the objective lens 25 are arranged in conjugate positions. The photodetector 43 detects reflected light from the spherical body 30 via the image-capturing optical system 110.

It goes without saying that the photodetector 43 is not limited to a line sensor but may be a zero-dimensional sensor. In a case where the zero-dimensional sensor is used, the confocal optical system can be configured by combining the zero-dimensional sensor with a pinhole or a point light source. In such a case, the slit 16 does not have to be used.

The stage 31 changes a height of the spherical body 30 such that the surface of the spherical body 30 is set to the light collecting position of the illumination light L1. In the image-capturing optical system 110, in a case where the surface of the spherical body 30 is set to the light collecting position of the illumination light L1, a detected light amount by the photodetector 43 becomes highest. In other words, reflected light from a plane deviated from the focal plane of the objective lens 25 is not detected by the photodetector 43.

As described above, the scanner 22 performs a scan on the spherical body 30 by the illumination light L1. Thus, the image-capturing apparatus 100 can acquire a confocal image of the surface of the spherical body 30 or the sample. The photodetector 43 captures a confocal image in which the surface of the spherical body 30 is set to the focusing position. The confocal image becomes a two-dimensional image in the XY directions. Note that when an image of reflected light is captured by the image-capturing optical system 110, there are a case where the Z-scan is not performed and an image is normally captured and a case where an image in which a whole field of view is focused (all-in-focus image) is captured by performing the Z-scan (focus scan). The latter all-in-focus image is used for a surface having large unevenness. Because measurement of a reflected image and of unevenness of the surface can simultaneously be performed by performing the Z-scan, the height image can be acquired.

The analyzer 42 is arranged between the lens 41 and the photodetector 43. The analyzer 42 is rotatably arranged on the optical path of the reflected light L2. A rotation axis of the analyzer 42 is parallel with the optical axis. The analyzer 42 is a polarizing element which transmits only a predetermined linearly polarized light component. In other words, the linearly polarized light which is parallel with a transmission axis of the analyzer 42 is detected by the photodetector 43. By rotating the analyzer 42, a direction of the linearly polarized light to be detected by the photodetector 43 can be changed.

Figure 2:
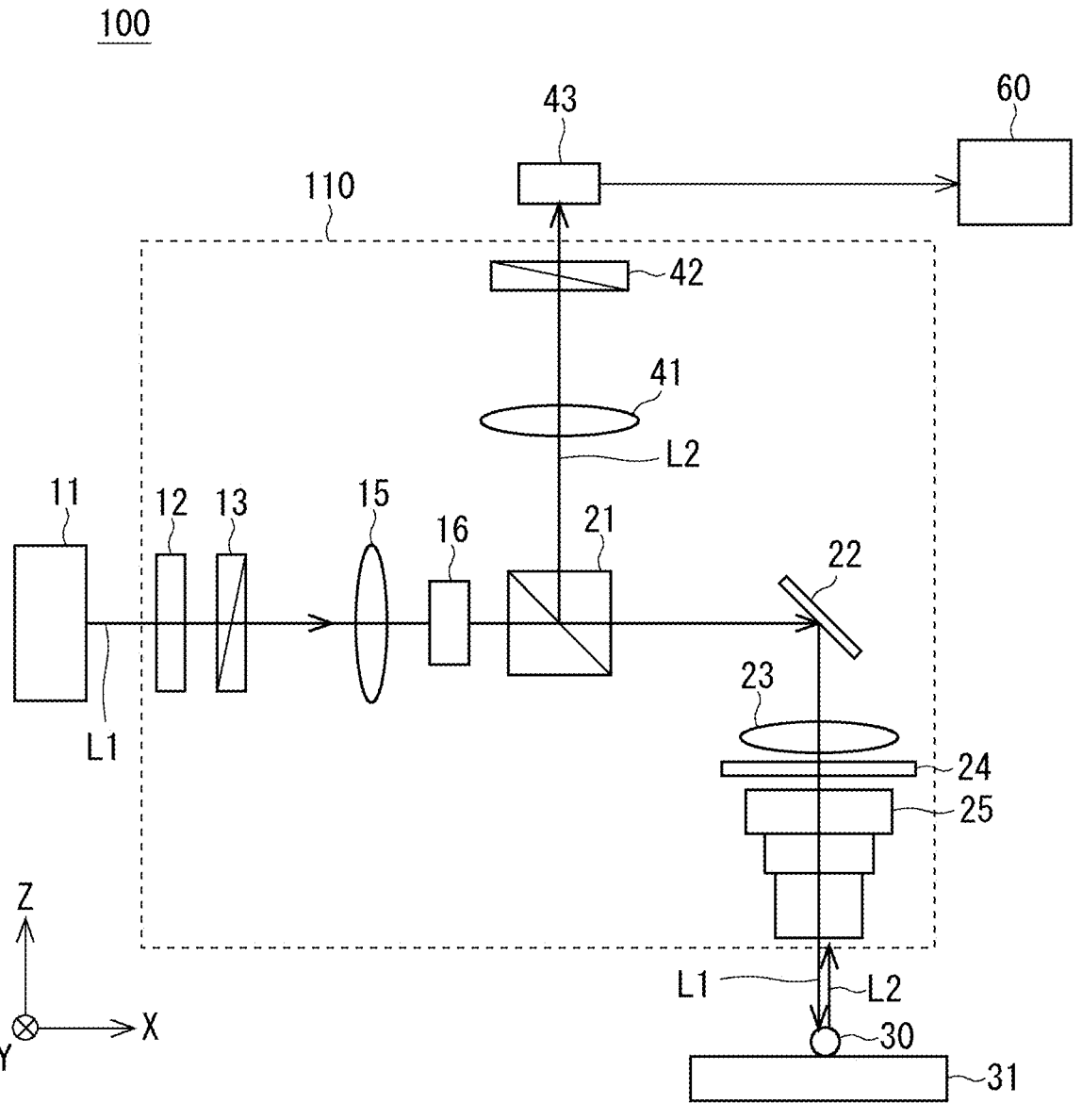
FIG. 2 illustrates a configuration of an image-capturing apparatus which is used in a calculation method according to a first embodiment.

Note that in FIG. 2, the analyzer 42 is arranged in an immediately adjacent position to the photodetector 43, but the position of the analyzer 42 is not particularly limited. It is sufficient that the analyzer 42 is arranged in the image-capturing optical system 110 such that the reflected light L2 branched from the illumination light L1 by the half mirror 21 is incident on the analyzer 42. The analyzer 42 may be in crossed-Nicol arrangement with respect to the polarizer 13. A path difference between the ordinary light and the extraordinary light is not changed even when the analyzer 42 is rotated, but an amplitude of bright and dark bands of interference fringes, which will be described, is changed. When the analyzer 42 and the polarizer 13 are in the crossed-Nicol arrangement, the amplitude of the interference fringes becomes a maximum.

The processing unit 60 acquires the confocal image captured by the photodetector 43. The processing unit 60 is an information processing apparatus such as a personal computer. The processing unit 60 has a memory or the like which stores confocal images. The processing unit 60 stores the detected light amount by the photodetector 43 in association with XYZ coordinates. The processing unit 60 constructs the all-in-focus image while associating the XYZ coordinates with the detected light amount, for example. Specifically, the all-in-focus image becomes an image having a two-dimensional reflection intensity (bright-field). The processing unit 60 acquires the height image of the spherical body 30. The height image is reconfigured in the processing unit 60 such that the height image becomes a three-dimensional (the height is expressed by grayscale). The processing unit 60 may control drive of the stage 31.

Next, the present calculation method and the image-capturing method (referred to as present image-capturing method) according to the first embodiment will be described with reference to FIG. 3. The present calculation method includes step S101 to step S106. The present image-capturing method includes step S101 to step S108.

First, the image-capturing optical system 110 as the confocal optical system is used to measure a three-dimensional shape of the surface of the spherical body 30 (step S101). In this case, the polarizer 13, the Nomarski prism 24, and the analyzer 42 may be detached from the optical path of the image-capturing optical system 110. Note that only the polarizer 13 and the analyzer 42 may be detached. The objective lens 25 used in step S101 may be different from the objective lens 25 which is used in differential interference contrast observation.

Figure 4:
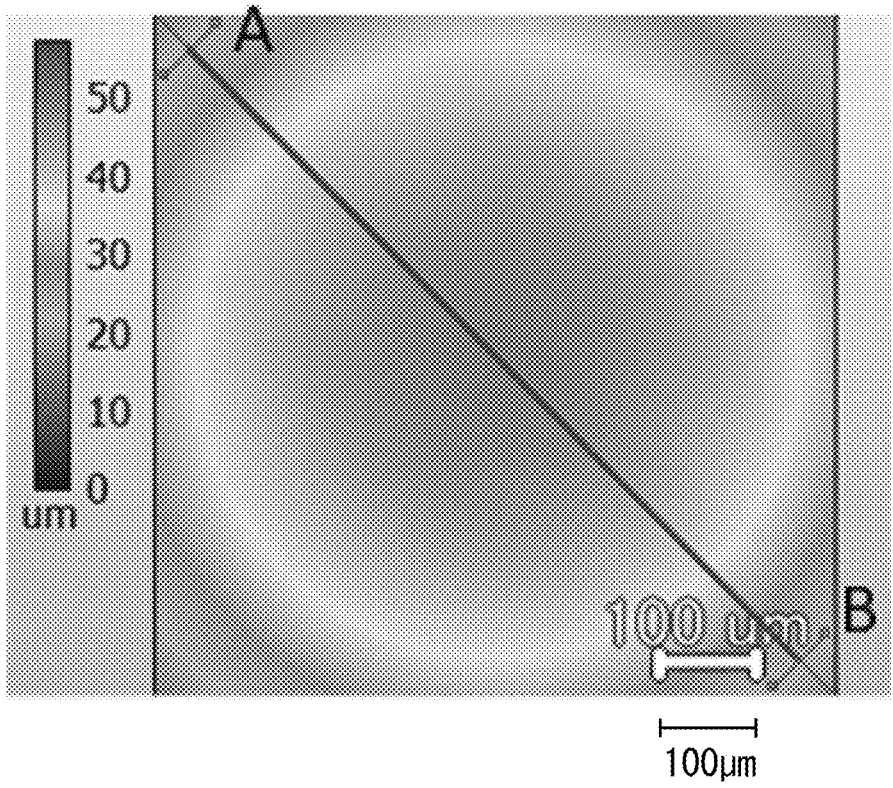
FIG. 4 illustrates measurement results of a three-dimensional shape of a spherical body surface.

FIG. 4 illustrates one example of the three-dimensional shape of the spherical body 30 which is measured by the image-capturing apparatus 100. The height of the surface of the spherical body 30 is represented by grayscale. A line A-B indicates a line along the shear direction.

Returning to FIG. 3, the description will be continued. Next, based on the three-dimensional shape of the surface of the spherical body 30, a radius R of the spherical body 30 is estimated (step S102).

Figure 5:
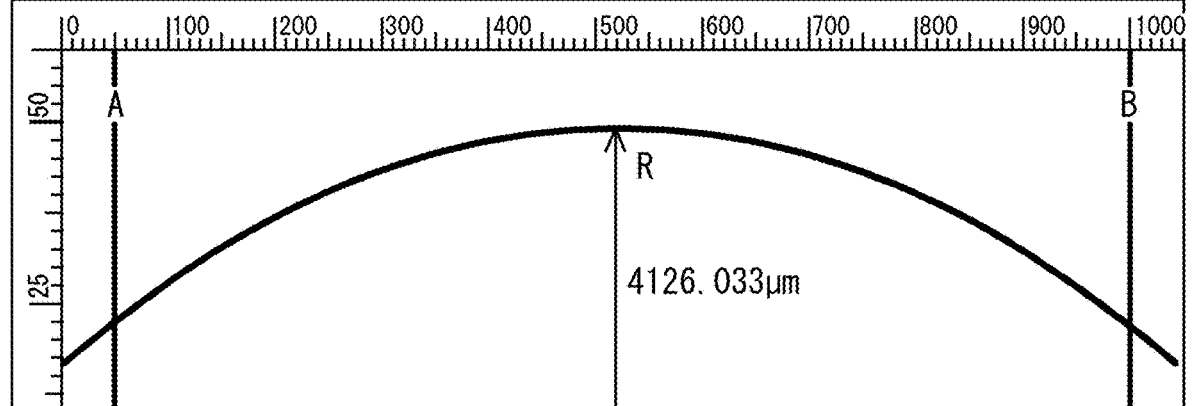
FIG. 5 is a diagram for explaining a method for estimating a radius of a spherical body.

A calculation method of the radius R will specifically be described with reference to FIG. 5. FIG. 5 illustrates a profile of the height along the line A-B in FIG. 4. The radius R (for example, 4126.033 μm) is calculated by performing least square fitting by a circle for the profile of the height.

Returning to FIG. 3, the description will be continued. Next, switching to the differential interference contrast observation is performed (step S103). Here, the objective lens 25 is selected whose shear amount is desired to be calculated. As one example, a description will be made about a case where the objective lens 25 is selected whose numerical aperture (NA) is 0.15 and whose magnification is 5 times. A limit angle θ, at which the reflected light can be received, as seen from the optical axis is defined from the NA. The angle θ is 8.6 degrees, and a radius r of a partial circle which is seen in the field of view is 600 μm. The field of view (3 mm) of the objective lens in a case of NA=0.15 includes a whole region in which reflection observation can be performed. In a case of R=4,000 μm, even if the shear amount is 1 to 10 μm, the path difference in the partial circle is sufficiently larger than an illumination wavelength λ (for example, 546 nm). As described above, the radius R, the NA, and the field of view have to be set such that the path difference in the partial circle becomes several times the illumination wavelength λ.

Next, the differential interference contrast image of the surface of the spherical body 30 is captured by the image-capturing optical system 110 and the Nomarski prism (step S104). The differential interference contrast image of the surface of the spherical body 30 will specifically be described with reference to FIG. 6 and FIG. 7.

Figure 6:
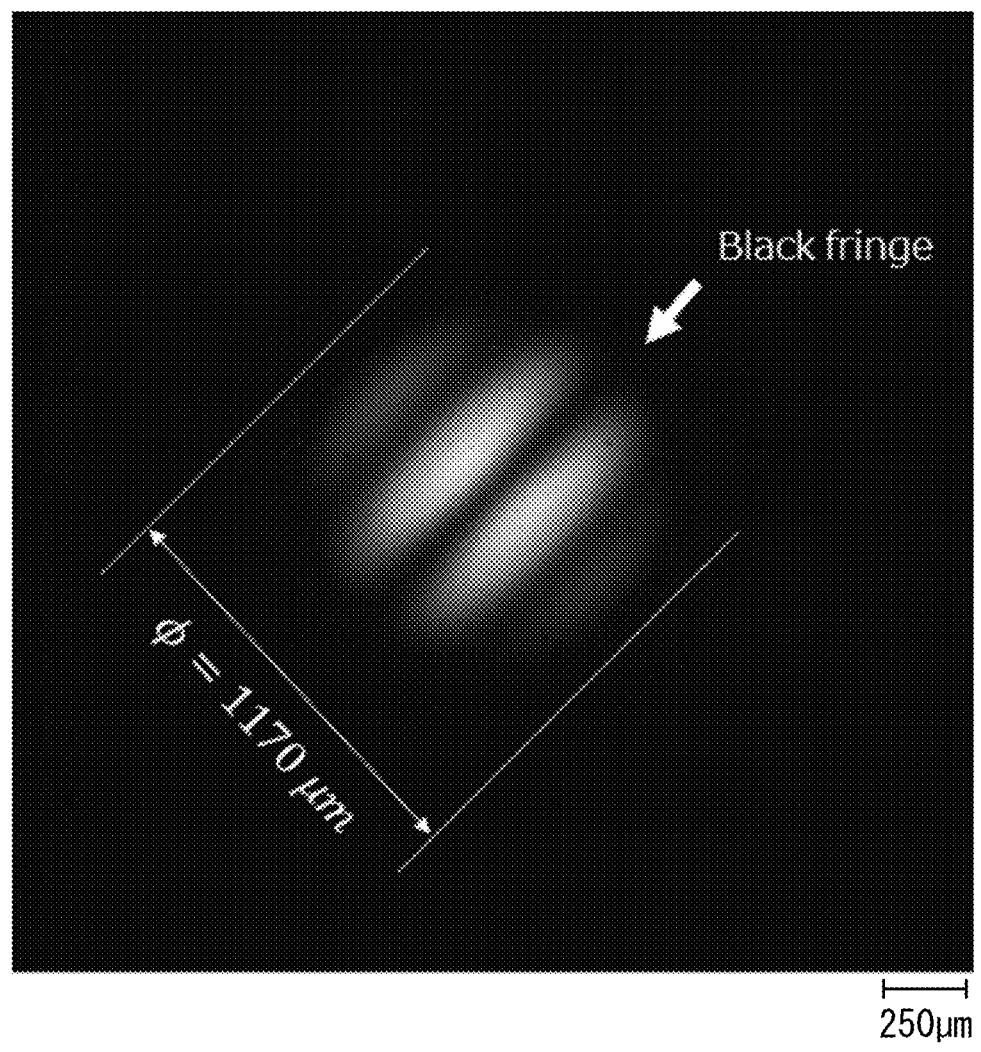
FIG. 6 is a differential interference contrast image of the spherical body surface in a case where white light is used.
Figure 7:
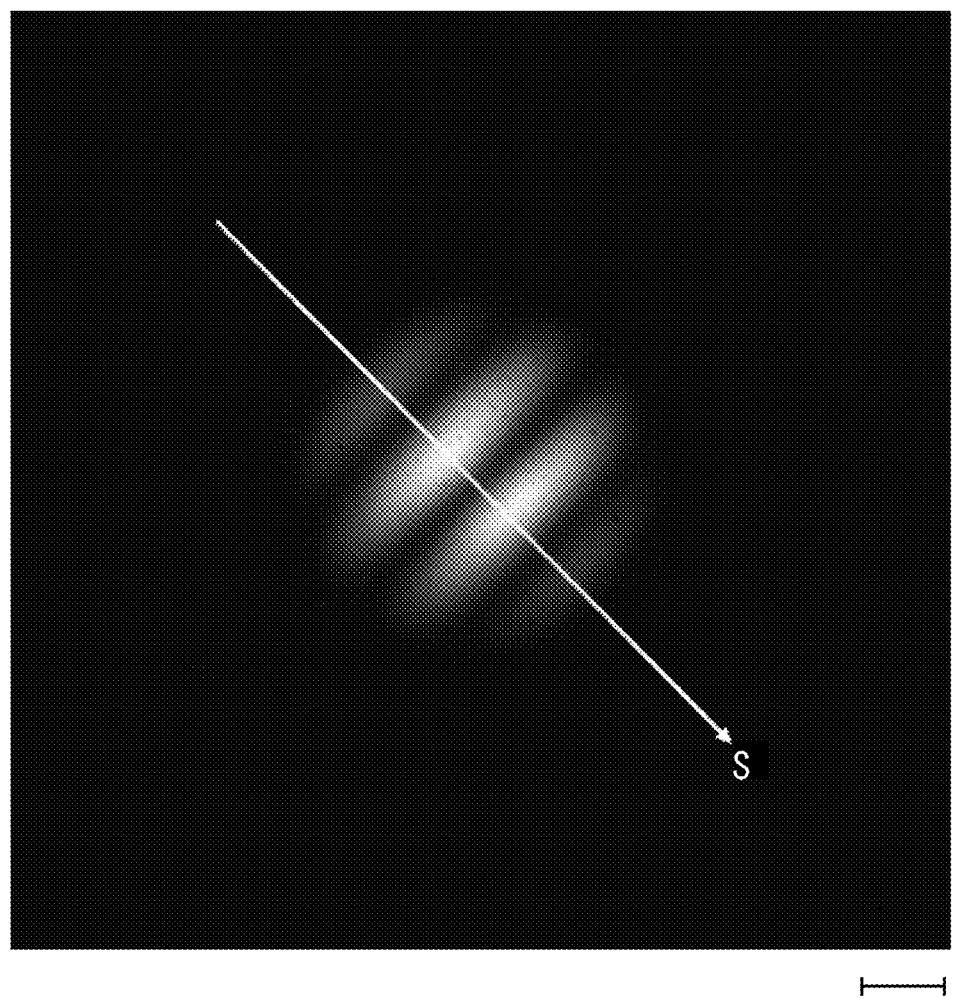
FIG. 7 is a differential interference contrast image of the spherical body surface in a case where monochromatic light is used.

FIG. 6 illustrates the differential interference contrast image in a case where white light is used, and FIG. 7 illustrates the differential interference contrast image in a case where monochromatic light is used. Note that color interference fringes can be obtained in a case where white light is used, but FIG. 6 illustrates a grayscale image converted from the color interference fringes. A black fringe in a central portion exhibits a zero-order interference fringe. A diameter φ of a partial circle seen in the field of view is 1,170 μm.

An s-direction illustrated in FIG. 7 (the direction in which interference fringes are aligned) indicates the shear direction of the Nomarski prism 24. In the following steps, the differential interference contrast image in a case where monochromatic light is used is used. Consequently, in step S104, only the differential interference contrast image in a case where monochromatic light is used may be captured.

Returning to FIG. 3, the description will be continued. Next, a fringe interval of the interference fringes is measured, the interference fringes being included in the differential interference contrast image captured in step S104 (step S105).

Figure 8:
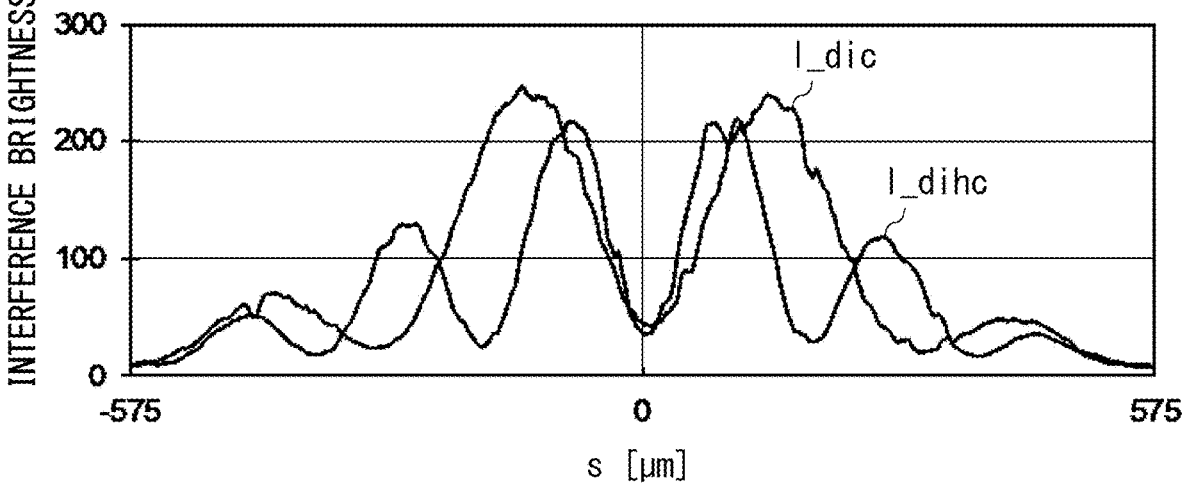
FIG. 8 is a diagram illustrating profiles of differential interference contrast images along a shear direction.

A measurement method of the fringe interval will specifically be described with reference to FIG. 8. FIG. 8 illustrates profiles of differential interference contrast images along the shear direction. The vertical axis represents interference brightness, and the horizontal axis represents a position in the shear direction. FIG. 8 includes a profile I_dic and a profile I_dihc. The profile I_dic is acquired from the differential interference contrast image captured by using a first differential interference contrast prism (referred to as DIC), and the profile I_dihc is acquired from the differential interference contrast image captured by using a second differential interference contrast prism (referred to as DIHC). The shear amount of the DIC is smaller than the shear amount of the DIHC. Note that in the present calculation method, because the fringe interval can be measured from one differential interference contrast image, two kinds of differential interference contrast images do not have to be captured in step S104. When the fringe interval is measured, for example, a distance between peaks included in the I_dic or the I_dihc is measured. A valley width (a distance in which the valley has half its depth) of zero-order interference fringes may be measured. By doubling the width of the valley, the fringe interval of the interference fringes can be measured.

Returning to FIG. 3, the description will be continued. Next, based on the radius R estimated in step S102 and the fringe interval measured in step S105, the shear amount of the Nomarski prism 24 is calculated by using a formula (1): $\Delta s=(\lambda \cdot R)/(2w)$ (step S106). Here, $\Delta s$ denotes the shear amount of the Nomarski prism 24. A term $\lambda$ denotes the wavelength of the monochromatic light used for capturing the differential interference contrast image. A term R denotes the radius of the spherical body. A term w denotes the fringe interval measured in step S105.

Next, a description will be made about a reason why formula (1) holds true. First, in a case where s is set as the shear direction, a profile z(s) of a height z of the surface of the spherical body can sufficiently precisely be approximated to a quadratic function in a range of $-r \leq s \leq r$. In a case where z(s) is approximated to a quadratic function, z(s) is expressed as $dz/ds=-s/R$. A change in a slope of the surface of the spherical body 30 in the shear direction of the Nomarski prism 24 is approximated by a linear function.

Consequently, a path difference L(s) between the ordinary light and the extraordinary light separated by the Nomarski prism 24 is expressed as $L(s)=2*(dz/ds)*\Delta s=2*(-s/R)*\Delta s$. When the path difference L(s) is converted to a phase difference $\delta(s)$, $\delta(s)=(2\pi/\lambda)*2*(-s/R)*\Delta s$ holds true. Because the phase difference becomes $2\pi$ in a case of s=w, the formula (1): $\Delta s=(\lambda \cdot R)/(2w)$ holds true.

Returning to FIG. 3, the description will be continued. Next, based on the shear amount calculated in step S106, the position of the Nomarski prism 24 is adjusted (step S107). Specifically, the Nomarski prism 24 is moved in a direction crossing the optical axis of the image-capturing optical system 110, and the path difference between the ordinary light and the extraordinary light is adjusted. For example, in a case where the relationship between a movement amount of the Nomarski prism 24 and a change amount of the path difference is known, the path difference between the ordinary light and the extraordinary light is calculated based on the shear amount, and the movement amount of the Nomarski prism 24 may thereafter be decided such that the path difference becomes a predetermined value. Here, in addition to position adjustment of the Nomarski prism 24, adjustment of brightness and contrast may be performed. In a case where the shear amount is not included in a reference range, the Nomarski prism 24 may be replaced.

Next, the sample is placed on the stage 31, and the differential interference contrast image of the sample is captured by the image-capturing optical system 110 and the Nomarski prism 24 (step S108). Before the sample is placed on the stage 31, the spherical body 30 may be removed from the stage 31. Because the path difference between the ordinary light and the extraordinary light is adjusted in step S106, an inspection can be performed under the same inspection condition.

The above-described sample may be a transparent substrate or a transparent wafer. As for the transparent substrate and the transparent wafer, removing back-surface reflected light is important for enhancing detection precision of defect. Consequently, the detection precision of defect can be improved by capturing the differential interference contrast image by using the confocal optical system.

Note that order may arbitrarily be set between estimation of the radius of the spherical body in steps S101 to S102 and measurement of the fringe interval of the interference fringes in steps S103 to S105. In a case where the radius R of the spherical body 30 is known, step S101 and step S102 may not be performed. The case where the radius R is known is, for example, a case where the spherical body 30 is precisely manufactured or a case where the radius R is in advance measured by means other than the confocal optical system. In such a case, the image-capturing optical system 110 do not have to be the confocal optical system.

Next, the image-capturing apparatus according to the first embodiment will be described with reference to FIG. 2 and FIG. 3. The processing unit 60 of the image-capturing apparatus according to the first embodiment includes a function for executing step S106 illustrated in FIG. 3. The processing unit 60 may further include a function for executing step S102 illustrated in FIG. 3.

In the calculation method, the image-capturing method, and the image-capturing apparatus according to the first embodiment, the shear amount of the differential interference contrast prism can easily be calculated from the fringe interval of the interference fringes included in the differential interference contrast image of the spherical body.

Both of measurement of a surface shape of the spherical body and image-capturing of the interference fringes based on the spherical body can be executed by the confocal optical system for capturing an image of the sample. Consequently, no other apparatus has to be prepared in addition to the confocal microscope. Meaningful calculation results can be acquired by performing measurement by using the confocal optical system to be used for an inspection.

In the above description, a case where the shear amount of the differential interference contrast optical system is calculated is given as an example, but the shear amount of the interference optical system (for example, a shearing interference optical system) other than the differential interference contrast optical system can also be calculated. It is assumed that a predetermined optical element which provides a relative lateral shift displacement to two rays of divided light is arranged on an optical path of the interference optical system. The predetermined optical element is not limited to a prism-shaped element but may be a wedge-shaped or flat-plate-shaped element.

In the above description, the sphere surface is given as the quadric surface whose interference contrast image is captured, but an interference contrast image of a quadric surface such as a circular column or a paraboloid may be captured. In a case where a radial direction of the circular column matches the shear direction, by setting the radius of the circular column as R, the shear amount can be calculated similarly to the sphere surface. In the above description, because the formula (1) is derived by approximating the profile of the height of the sphere surface by a quadratic function, a similar formula to the formula (1) is also derived in a case where the profile of the height is expressed by a quadratic function. For example, in a case where an expression of $z(s)=as^2$ is given, $dz/ds=2as$ holds true, and a formula: $\Delta s=(\lambda/2a)/(2w)$, which corresponds to the formula (1), is derived. When that is generalized, the shear amount can be calculated based on a constant (for example, the quadratic coefficient a or the radius R) in the formula expressing the quadric surface and the fringe interval. Note that a sphere surface is expressed as $x^2+y^2+z^2=R^2$ or the like, the radius R is a constant in the formula expressing a sphere surface.

Figure 3:
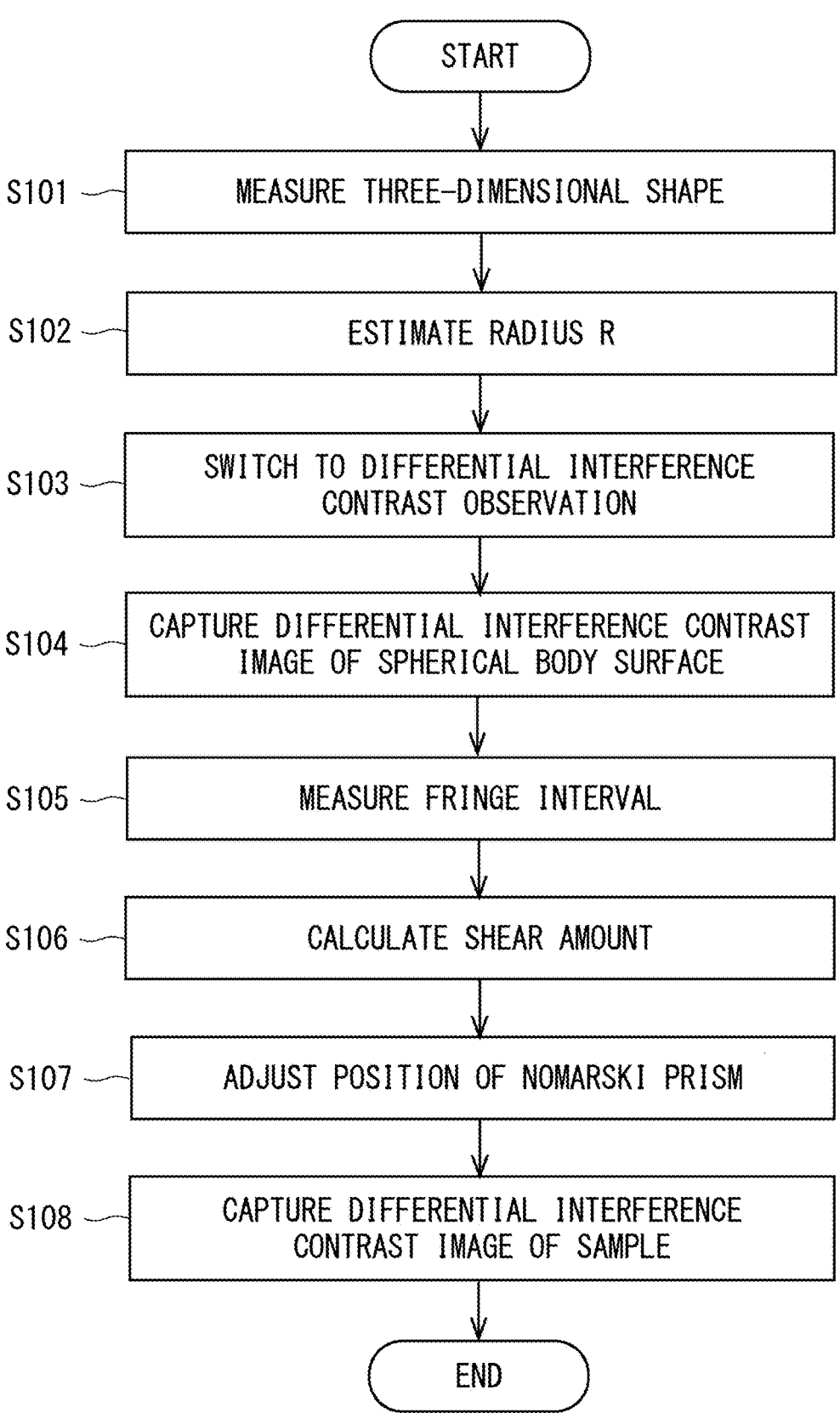
FIG. 3 is a flowchart illustrating a flow of the calculation method and an image-capturing method according to the first embodiment.

When the steps are generalized, in step S101 in FIG. 3, the three-dimensional shape of the quadric surface included in the object surface is measured by the interference optical system. In step S102, the constant in the formula expressing the quadric surface is estimated. In step S104, the interference contrast image of the quadric surface is captured. In step S106, the shear amount is calculated based on the constant in the formula expressing the quadric surface and the fringe interval. In step S7, the position of the optical element is adjusted such that the path difference between the two rays of light divided by the interference optical system becomes the predetermined value.

In a case where the quadric surface is a sphere surface, it is possible to determine not only the shear amount but also the shear direction. In a case where the shear direction is not known, evaluation may be started from a determination about the direction in which the interference fringes included in the interference contrast image are aligned and a decision about the direction of an S axis.

In the foregoing, the embodiment of the present disclosure has been described, but the present disclosure includes appropriate modifications which do not impair objects and advantages of the present disclosure and is not limited by the above embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information processing apparatus configured to control an imaging apparatus including an interference optical system having a predetermined optical element arranged on an optical path, the information processing apparatus comprising:

a processor configured to:

acquire, from the imaging apparatus, an interference contrast image of a quadric surface included in an object surface by the interference optical system;

measure a fringe interval of interference fringes included in the interference contrast image; and calculate a shear amount based on a constant in a formula expressing the quadric surface and the fringe interval, wherein the shear amount is a lateral shift between the two parallel light beams of illumination light transmitted through the predetermined optical element, the quadric surface is at least one of a surface of a spherical body, a surface of a circular column, or a parabolic surface, the formula expressing the surface of the spherical body is $x^2+y^2+z^2=R^2$, the formula expressing the surface of the circular column is $s^2+z^2=R^2$, the formula expressing the parabolic surface is $z=as^2$, z denotes a position in the height direction, x and y denote horizontal positions, s denotes a position in the shear direction, and R and a denote constants, and the shear amount is calculated based on the interference fringes obtained by illuminating the quadric surface with ordinary light and extraordinary light that are transmitted through the predetermined optical element, and the calculated shear amount is used for controlling or managing the imaging apparatus or the predetermined optical element.

2. The calculation method according to claim 1, wherein the interference optical system is a confocal optical system, and the calculation method further comprises:

a step of measuring a three-dimensional shape of the quadric surface by using the confocal optical system; and a step of estimating the constant based on the three-dimensional shape.

3. The calculation method according to claim 1, wherein in the step of calculating, a change in a slope of the quadric surface in the shear direction is approximated by a linear function.

4. An image-capturing method comprising:

calculating step of calculating a shear amount produced by a predetermined optical element which is arranged on an optical path of an interference optical system;

a step of adjusting a position of the predetermined optical element, by moving at least in a direction crossing the optical axis of the interference optical system, based on the shear amount calculated in the step of the calculating such that a path difference between two rays of light divided by the interference optical system becomes a predetermined value; and a step of capturing an interference contrast image of a sample by the interference optical system after the step of adjusting, wherein the step of calculating comprises:

a step of capturing an interference contrast image of a quadric surface included in an object surface by the interference optical system;

a step of measuring a fringe interval of interference fringes included in the interference contrast image; and a step of calculating the shear amount based on a constant in a formula expressing the quadric surface and the fringe interval, the shear amount is the lateral shift between the two parallel light beams of illumination light transmitted through the predetermined optical element, the quadric surface is at least one of a surface of a spherical body, a surface of a circular column, or a parabolic surface, and the formula expressing the surface of the spherical body is $x^2+y^2+z^2=R^2$, the formula expressing the surface of the circular column is $s^2+z^2=R^2$, the formula expressing the parabolic surface is $z=as^2$, z denotes a position in the height direction, x and y denote horizontal positions, s denotes a position in the shear direction, and R and a denote constants.

5. The image-capturing method according to claim 4, wherein the sample is a transparent substrate or a transparent wafer.

6. An image-capturing apparatus comprising:

an interference optical system;

a predetermined optical element being arranged on an optical path of the interference optical system; and a processing unit configured to execute:

a process of capturing an interference contrast image of a quadric surface included in an object surface by the interference optical system;

a process of calculating a shear amount of the predetermined optical element based on a fringe interval of interference fringes included in the interference contrast image and a constant in a formula expressing the quadric surface; and a process of adjusting a position of the predetermined optical element, by moving at least in a direction crossing the optical axis of the interference optical system, based on the shear amount calculated in the calculating process such that a path difference between two rays of light divided by the interference optical system becomes a predetermined value, wherein the shear amount is the lateral shift between two parallel light beams of illumination light transmitted through the predetermined optical element, the quadric surface is at least one of a surface of a spherical body, a surface of a circular column, or a parabolic surface, the formula expressing the surface of the spherical body is $x^2+y^2+z^2=R^2$, the formula expressing the surface of the circular column is $s^2+z^2=R^2$, the formula expressing the parabolic surface is $z=as^2$, z denotes a position in the height direction, x and y denote horizontal positions, s denotes a position in the shear direction, and R and a denote constants, and the shear amount is calculated based on the interference fringes obtained by illuminating the object having the quadric surface placed on a stage with ordinary light and extraordinary light that are the two parallel light beams.

7. The image-capturing apparatus according to claim 6, wherein the interference optical system is a confocal optical system, and the processing unit further executes a process of estimating the constant based on a three-dimensional shape of the quadric surface, the three-dimensional shape being measured by using the confocal optical system.

* * * * *